United States Patent [19]

Coughlin

[11] Patent Number: 4,924,208
[45] Date of Patent: May 8, 1990

[54] AUDIO INDICATOR FOR A MOTOR VEHICLE DIRECTION SIGNAL CIRCUIT

[76] Inventor: Joseph E. Coughlin, 1125 Jackson St., Easton, Pa. 18042

[21] Appl. No.: 298,485

[22] Filed: Jan. 18, 1989

[51] Int. Cl.$^5$ ............................................... B60Q 1/34
[52] U.S. Cl. ..................................... 340/474; 340/457
[58] Field of Search ............... 340/474, 475, 457, 326, 340/815.21, 815.22

[56] References Cited

U.S. PATENT DOCUMENTS

| | | | |
|---|---|---|---|
| 2,896,190 | 7/1959 | Gallaro et al. | 340/474 |
| 3,315,226 | 4/1967 | Fernekes | 340/474 |
| 3,343,123 | 9/1967 | Troesh | 340/474 |
| 3,806,868 | 4/1974 | Portman . | |
| 4,196,415 | 4/1980 | Haar et al. . | |
| 4,499,453 | 2/1985 | Right | 340/326 |
| 4,754,256 | 6/1988 | Fluhr et al. . | |

Primary Examiner—Joseph A. Orsino
Assistant Examiner—Brian R. Tumm
Attorney, Agent, or Firm—Steele, Gould & Fried

[57] ABSTRACT

An audio indicator is provided for a motor vehicle direction signal circuit of the type including a battery and a turn signal switch connecting the battery to at least one indicator lamp through a set of switchable contacts in a plug-in timer can, and with structure for intermittently opening and closing the contacts to flash the indicator lamps. The audio indicator has an electrically operated sound generating device with a substantially greater series resistance than the indicator lamps, and that is connected in parallel with the contacts of the timer can. When the timer can contacts are closed, the indicator lamps are "on", and current is shorted through the contacts such that the sound generating device is "off". When the timer can contacts are open, the indicator lamps are "off", and substantially all of the voltage from the battery appears across the sound generating device and the sound generating device is "on". The audio indicator is connected between the timer can and its receptacle by means of a thin connector bridged by prongs extending through the connector effecting a plug-in connection of the timer can and the turn signal circuit of the motor vehicle.

15 Claims, 2 Drawing Sheets

AUDIO INDICATOR FOR A MOTOR VEHICLE DIRECTION SIGNAL CIRCUIT

BACKGROUND OF THE INVENTION

1. Field of the Invention

This invention relates generally to motor vehicles, and more particularly to turn signal indicators for motor vehicles.

2. Description of the Prior Art

The turn signal circuit commonly found in motor vehicles includes a battery and a turn signal switch that is operable by the driver. The turn signal switch connects the battery to at least one indicator lamp through a set of contacts. A device for intermittently opening and closing the contacts flashes the indicator lamps to alert other drivers of an impending turn of the vehicle. The intermittent opening and closing of the contacts is accompanied by a clicking sound which alerts the driver to the operation of the turn signal circuit. An automatic shut off for the circuit is commonly provided in most vehicles, but does not always open the circuit properly and the driver must do so manually.

The turn signal is often needlessly left on because the driver cannot hear the clicking sound of the turn signal circuit. Persons who have impaired hearing abilities cannot hear the sound of the turn signal circuit. Those without hearing problems also cannot often hear the clicking of the turn signal circuit over the sound of the engine, air conditioner, heater blowers, and loud noises from surrounding traffic. It would be desirable to provide a device which would provide an audible signal of greater intensity than that commonly found in the turn signal circuit, and which could thereby be heard above these noises and by those who have hearing impairments.

Few drivers have the desire or skill to make alterations to the electrical circuitry of an automobile. Assistance of a skilled automotive technician is usually expensive, and the installation expense of many motor vehicle add-on devices inhibit many drivers from utilizing these devices. It would therefore also be desirable to provide an audio indicator for a motor vehicle direction signal circuit could be easily installed by the driver without assistance, or with relatively little assistance by a skilled technician.

SUMMARY OF THE INVENTION

It is an object of the invention to provide an audio indicator for a motor vehicle direction signal circuit which will provide an easily-connected high-volume audio signal source indicating operation of the turn signal circuit.

It is another object of the invention to provide an audio indicator which will work effectively with the existing turn signal timer circuit of the motor vehicle.

It is yet another object of the invention to provide an audio indicator which is easily installed in the motor vehicle, and can usually be installed by drivers without assistance.

These and other objects are accomplished by an audio indicator for a motor vehicle direction signal circuit of the type including a battery and a turn signal switch connecting the battery to the indicator lamps of the motor vehicle through a set of contacts. A device for intermittently opening and closing the contacts to flash the indicator lamps is provided in most vehicles as a turn signal timer/switching can which plugs into a suitable receptacle in the turn signal circuit.

An electrically operated sound generating device is connected in parallel with the contacts. The sound generating device generally has a substantially greater resistance than do the indicator lamps. When the contacts are closed, the indicator lamps are "on", and current is shorted through the contacts such that the sound generating device is "off". When the contacts are open, the indicator lamps are "off", and substantially all of the voltage from the battery appears across the sound generating device such that the sound generating device is now "on". The sound generating device thereby produces an intermittent audible signal alternating with the operation of the indicator lamps, alerting the driver of activation of the turn signal circuit.

The contacts and structure for intermittently opening and closing the contacts in the turn signal circuit are commonly provided in a turn signal can which is connectable by plug means to a suitable receptacle in the turn signal circuit of the motor vehicle. A disk according to the invention can be provided with female connection means adapted to receive male plugs from the signal timer can. The disk is dimensioned to permit the plugs from the timer can to pass through the disk and to engage the receptacle in the turn signal circuit of the motor vehicle. The disk is thereby positioned between the receptacle and the signal timer can.

The sound generating device can be provided in combination with the disk, such that it will be mounted adjacent to the receptacle and the signal timer can. In an alternative embodiment, the sound generating device can be mounted separately from the disk to a portion of the motor vehicle, usually beneath the dashboard. A pair of wires connects the sound generating device to the disk and the turn signal circuit. A double sided adhesive tape can be utilized to secure the sound generating device to the dashboard or other portion of the motor vehicle.

The sound generating device is preferably of the piezo electric crystal type, the operation of which is known. The sound generating device can be selected to generate a variety of audio signals, usually a tone or a buzz. The volume and frequency of the signal can be varied. An 80 dB tone generator operating at about 2800 hertz is preferred.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
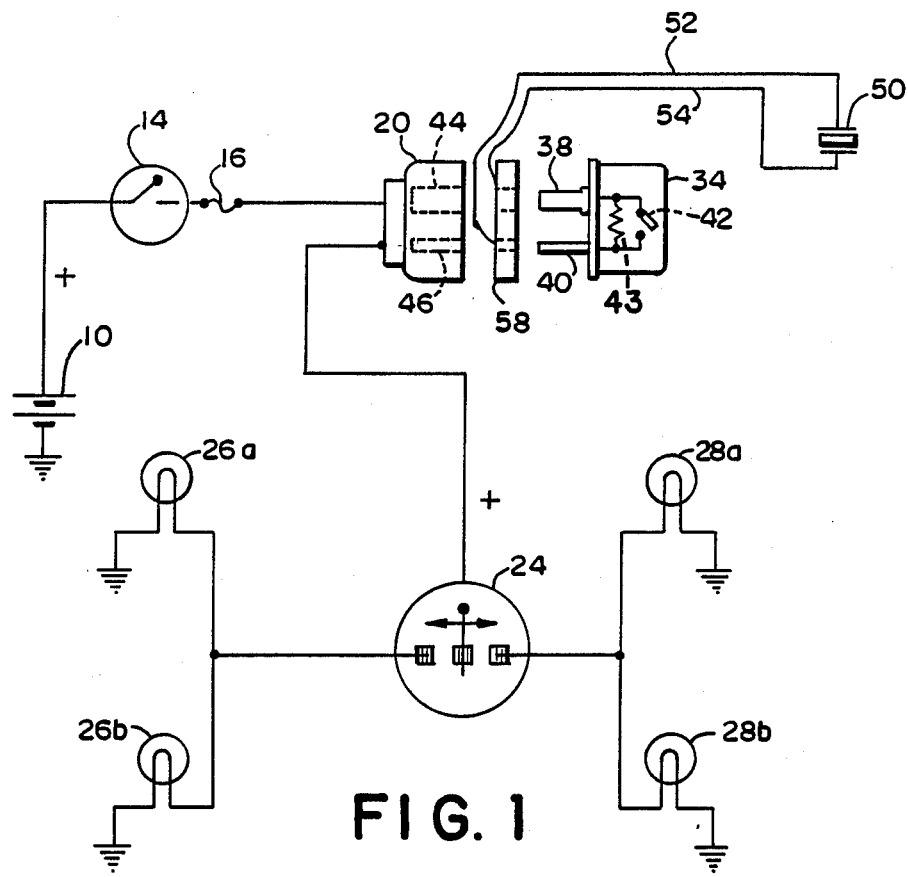
FIG. 1 is an exploded schematic diagram of the turn signal circuit of a motor vehicle and of the audio indicator of the invention, partially in phantom to depict internal features.

Referring to FIG. 1, there is shown a common turn signal circuit for a motor vehicle. Although the invention will be described with reference to this circuit, it will be apparent to one skilled in the art that the invention could be utilized with other turn signal circuits.

The turn signal circuit comprises a battery 10 connected between vehicle ground and the ignition switch 14 of the motor vehicle. A fuse 16 is typically provided for circuit protection. A receptacle 20 defines a switchable path for connecting battery power via the ignition switch 14 to the turn signal selector switch 24 and then to the turn signal lamps. The receptacle 20 may be placed, for example, in the fuse box of the motor vehicle or near to the ignition and turn signal selector switches of the vehicle. The turn signal selector switch 24 has (at least) a single pole, double throw switch connectable to either the left turn signal lamps 26a, 26b, or the right turn signal lamps 28a, 28b. The turn signal indicator lamps 26a, 26b and 28a, 28b are connected to vehicle ground.

Most motor vehicle manufacturers provide a separate and detachable timer signal can 34 which is plugged into the receptacle 20 and thus periodically opens and closes the turn signal circuit, when activated, by suitable electrical connection means. The timer signal can 34 typically has electrical contacts connectable in series with the turn signal lamps via the turn signal circuit receptacle 20, and a resistively-heated bimetallic switching means for intermittently opening and closing the contacts to flash the turn signal indicator lamps 26a, 26b and 28a, 28b when the turn signal selector switch 24 is placed in the left or right "on" position. A preferred electrical connection means is a plug means. Male prongs 38, 40 on the timer signal can 34 are adapted for insertion into female electrical connection openings 44, 46 in the receptacle 20. The prongs 38, 40 make connection between the receptacle contacts and the means for intermittently opening and closing the contacts with the turn signal circuit.

Figure 5A:
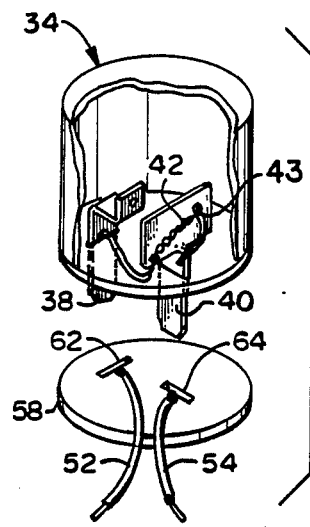
FIG. 5a is an elevation view of a timer switching can, with cover removed.
Figure 5B:
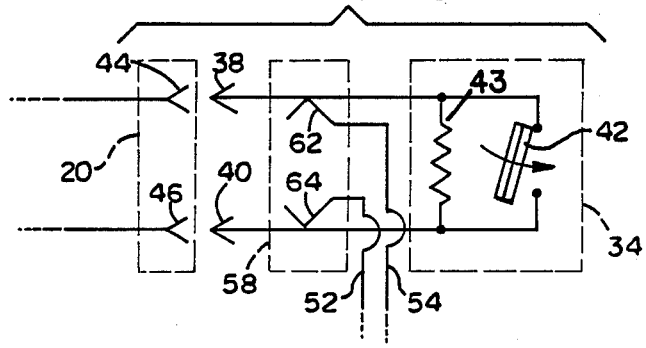
FIG. 5b is a schematic diagram showing operation of the timer can.

The means for intermittently opening and closing the contacts can vary with the manufacturer, and a representative embodiment using a bimetallic switch pole is shown in the timer signal can 34 of FIG. 1, 5a and 5b. A bimetallic strip 42 switchably spanning two circuit contacts is placed adjacent to and in series with a resistive heating element 43. When the turn signal is selected by the operator. The switched circuit in timer 34 is open while current flow through resistive element 43 heats the adjacent bimetallic strip 42. The bimetallic strip 42 flexes as it is heated, eventually snapping over to close the switched circuit between prongs 38, 40 and lighting the turn signal lamps. The resistive element 43 remains connected between prongs 38, 40 at all times, but is shorted out when the switched contacts close. The element 43 then is inoperative. The bimetallic strip cools and eventually snaps back to the open condition, whereupon the turn signal lamps go off. Resistive element 43, however, is no longer shorted. Element 43 begins to heat the bimetallic strip 42 to again close the circuit and repeat the cycle.

Figure 2:
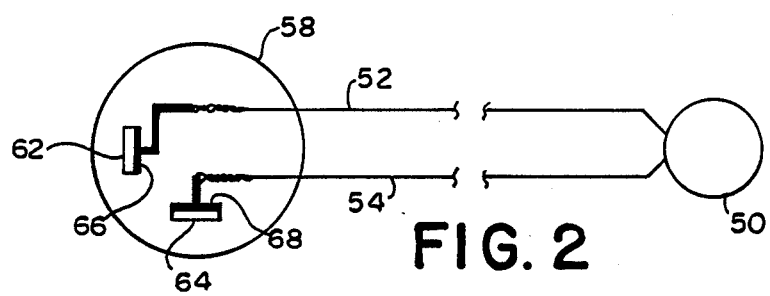
FIG. 2 is a plan view of an audio indicator according to the invention, partially broken to indicate indefinite length.
Figure 3:
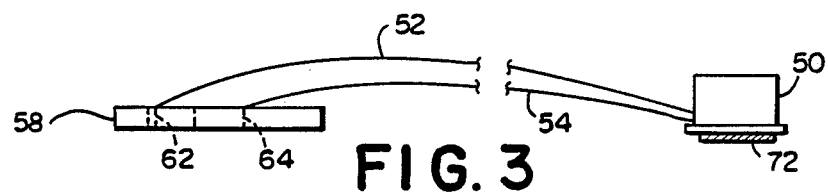
FIG. 3 is a side elevation, partially broken to indicate indefinite length and partially in phantom to depict internal features.

The audible signal generating device of the invention is connected in parallel with the contacts 38, 40 and the means for intermittently opening and closing the contacts in the signal timing can 34. That is, the audible signal generation is connected in parallel with resistive heater 43. The sound generating device 50 is placed in contact with the circuitry of the timing signal can 34 by a pair of conductors 52, 54, preferably leading to a thin connector fitting between can 34 and receptacle 20. The conductors 52, 54 can be connected to either prong 38, 40 of the timing signal can, or the openings 44, 46 of the receptacle 20. It is preferable, however, to make connection between the sound generating device 50, the signal timer can 34, and the receptacle 20 of the turn signal circuit by the provision of a disk 58 (FIGS. 2, 3 and 5a). The disk 58 can have any shape which has a pair of connecting apertures 62, 64 which are adapted to receive the prongs 38, 40 of the timing can 34 and means (preferably prongs 38, 40 themselves) for engaging receptacles 20. Electrical connection means 66, 68 are provided adjacent to the apertures 62, 64, respectively. The electrical connection means 66, 68 are adapted to make electrical contact between conductors 52, 54 and the prongs 38, 40 of the timing can 34 when the prongs are inserted through the apertures 62, 64. The electrical connections 66, 68 connected to the wires 52, 54, respectively, lead to the sound generating device 50. The sound generating device 50 is thereby connected in parallel to the circuitry of the signal timing can 34, including the contacts and the means for intermittently opening and closing the contacts.

The sound generating device 50 should have a resistance sufficiently greater than that of the circuitry of the signal timer can 34 that operation is not adversely affected (i.e., greater than the resistance of heater 43). When the contacts of the signal timer can 34 are closed, the indicator lamps 26a, 26b or 28a, 28b are "on", and current is shorted through the contacts such that the sound generating device 50 and heater 43 are both "off". When the contacts are open, the indicator lamps 26a, 26b, or 28a, 28b are "off", and substantially all of the voltage from the battery 10 appears across the sound generating device 50, the resistance of which, is parallel with heater 43, is still much greater than the resistance of the signal lamps. The sound generating device 50 is thereby "on" when the lamps are "off", and the sound generating device 50 produces an audible signal alternating with the lamps, alerting a driver of activation of the signal circuit. The audible signal produced by the sound generating device 50 is synchronous and alternating with the operation of the indicator lamps 26a, 26b or 28a, 28b. This reminds the driver to turn off the turn signal if mechanical means fail to do this. Inasmuch as the frequency of operation is affected by the amount of current passing, the device produces an audible signal that changes when a lamp in the circuit burns out.

The sound generating device 50 can be selected from many available devices suitable for this purpose, but preferably is of the piezo electric type. The volume and frequency of the sound produced can be chosen as appropriate for audibility. A preferred embodiment generates an 80 dB tone or buzz at about 2800 hertz. This tone can also be dependent on the amount of current passing, as above.

The sound generating device 50 can be selected for compatability to different voltage installations, usually either 6, 12, or 24 volts. A typical piezoelectric device on the market operates between 2 and 18 volts. Reversible connector 58 connects the device 50 to the circuit and can be flipped over to match the device to vehicle polarity, if necessary.

The audio indicator of the invention is easily installed in existing motor vehicle turn signal circuits. The timer signal can 34 removed from the receptacle 20. The reversible connector 58 is receives the prongs 38, 40 of the timer signal can 34. This is accomplished by positioning the prongs 38, 40 in the apertures 62, 64. The thickness of the disk 58 is less than the length of the prongs 38, 40, such that the prongs extend beyond the disk 58 and can be engaged to the openings 44, 46 in the receptacle 20 with the disk 58 positioned between the can 34 and the receptacle 20. The sound generating device 50 is then secured to a portion of the motor vehicle, preferably beneath the dashboard. This can be accomplished by the use of a double sided adhesive pad 72. The sound generating device 50 is thereby quickly and easily installed in parallel with the timer signal can 34 and will alert the driver of the operation of the turn signal indicator lamps with an easily discernable audio signal.

Figure 4:
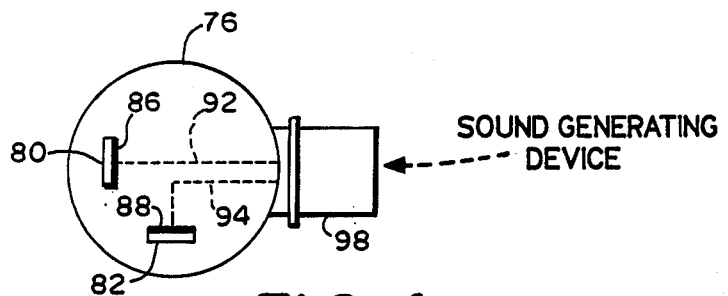
FIG. 4 is a plan view of an alternative embodiment, partially in phantom to depict internal features.

In an alternative embodiment, the sound generating device is provided in a single unit with the mounting disk such that a separate mounting of the sound generating device is not necessary. A suitable structure is shown in FIG. 4. A disk portion 76 includes connecting apertures 80, 82 which, as before, are adapted to engage the prongs 38, 40 of the timer signal can 34. Electrical connection means 86, 88 are provided adjacent the connection openings 80, 82, respectively, and are adapted to make electrical connection with the prongs 38, 40 when the prongs are positioned in the apertures 80, 82. Electrical conductors 92, 94 lead from the contacts 86, 88, respectively, to sound generating portion 98. The electrical conductors 92, 94 can be embedded within the disk portion 76. The sound generating portion 98 is fixed substantially to the perimeter of the disk portion 76 so as not to interfere with the connection of the disk portion 76 and the timer signal can 34 to the receptacle 20.

This invention can be embodied in other specific forms without departing from the spirit or essential attributes thereof and accordingly, reference should be made to the following claims, rather than to the foregoing specification, as indicating the scope of the invention.

I claim:

1. An audio indicator for a motor vehicle direction signal circuit including a battery and a turn signal switch connecting the battery to at least one indicator lamp through a set of periodically switchable contacts and mean for intermittently opening and closing said contacts to flash the indicator lamps, the audio indicator comprising:
    an electrically operated sound generating device connected in parallel with said switchable contacts, whereby when said contacts are closed, said indicator lamps are "on", and current is shorted through said contacts such that said sound generating device is "off"; and when said contacts are open, said indicator lamps are "off", battery voltage appearing across said switchable contacts and said sound generating device, whereby said sound generating device is "on", said sound generating device thereby producing an intermittent audible signal alternating with operation of the indicator lamp, alerting a driver of activation of said signal circuit.

2. The indicator of claim 1, wherein said sound generating device is connectable in parallel with said contact by plug means.

3. The indicator of claim 2, wherein said contacts and said means for intermittently closing said contacts are provided in a turn signal timer can connectable by plug means to a receptacle in said signal circuit.

4. The indicator of claim 3, wherein said plug means of said sound generating device comprise disk means with female connection means adapted to receive male plug means from said signal timer can, said disk means being adapted for positioning between said receptacle and said signal timer can.

5. The indicator of claim 4, wherein said sound generating device is fixed substantially to the perimeter of said disk means.

6. The indicator of claim 4, wherein said sound generating device includes a piezo electric crystal.

7. An apparatus for alerting a driver of a motor vehicle of operation of turn signal lamps of a turn signal circuit of the vehicle, said turn signal circuit having a battery, a turn signal switch, at least one said turn signal lamp, a receptacle having plug connector means, and an intermittent flash timing can, said timing can comprising contact means, means for intermittently closing and opening said contact means, and its own plug connector means adapted for connection to said plug connector means of said receptacle, said apparatus further comprising electrical connector means adapted for connection between said connector means of said receptacle and said connector means of said timing can, and a sound generating device having a substantially greater series resistance than said indicator lamps and connected between said electrical connector means and in parallel with said contact means of said timing can when said alerting apparatus is connected between said receptacle and said signal can.

8. The apparatus of claim 7, wherein said plug connector means of said timing can comprise male connector prongs and said plug connector means of said receptacle comprise female connector slots and said alerting apparatus comprises a disk, said disk having aperture permitting the passage of said prongs, said connector means of said alerting apparatus being adapted to make electrical connection with said prongs when said prongs are inserted through said apertures, said disk having a thickness permitting said prongs to pass through said apertures and connect to said female connector slots in said receptacle.

9. The apparatus of claim 8, wherein said sound generating device includes a piezo electric crystal.

10. A method for installing an apparatus for alerting a driver of a motor vehicle to operation of a turn signal circuit and of turn signal indicator lamps of the vehicle, comprising the steps of:
    unplugging from a receptacle in the motor vehicle a turn signal can, said turn signal can having flash timing means intermittently closing said turn signal circuit for connecting power to said indicator lamps when said circuit is powered, the turn signal can having plug means adapted for electrical connection to mating plug means provided in said receptacle;
    connecting to said plug means of said turn signal can a sound generating device having a substantially greater series resistance than said indicator lamps, by means of electrical connection means such that said sound generating device is in parallel with said flash timing means of said turn signal can; and,
    replacing said prongs of said turn signal can into said mating plug means of said receptacle.

11. The method of claim 10, wherein said connection step of said sound generating device comprises the positioning of said prongs of said turn signal can through apertures in a disk means, said electrical connection means of said sound generating device being provided adjacent to said apertures and being adapted to make electrical connection with said prongs when said prongs are placed through said apertures.

12. The method of claim 11, wherein said sound generating device is connected to the disk by flexible electrical wires.

13. The method of claim 12, further comprising means for mounting said sound generating device underneath the dashboard of a motor vehicle.

14. The method of claim 11, wherein said sound generating device is fixed substantially to the perimeter of said disk.

15. The method of claim 11, wherein said sound generating device comprises a piezo electric crystal.

* * * * *